May 4, 1948.  B. E. DE VOL  2,440,934
AUTOMATIC GRASS CATCHER
Filed Nov. 9, 1945
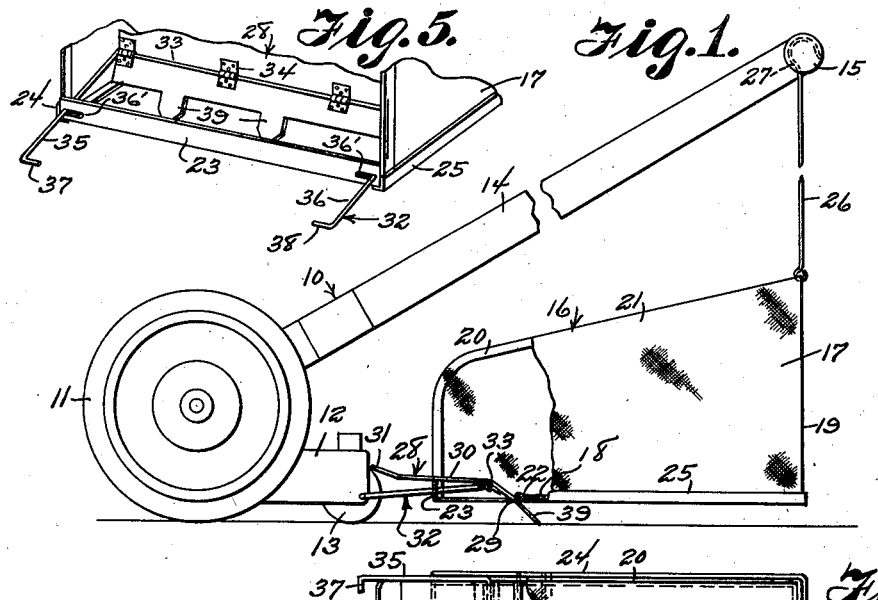
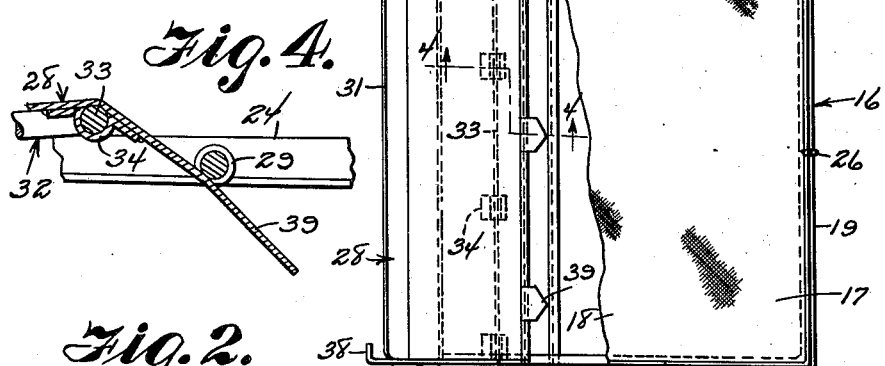
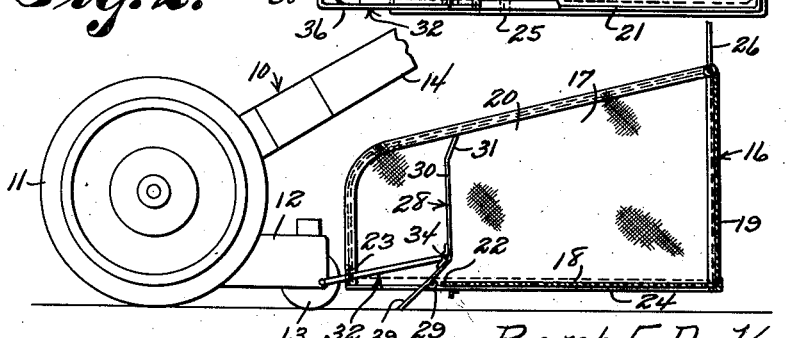
Bart E. DeVol
INVENTOR
BY *Victor J. Evans & Co.*
ATTORNEYS Patented May 4, 1948

2,440,934

UNITED STATES PATENT OFFICE 2,440,934

AUTOMATIC GRASS CATCHER

Bart E. De Vol, Santa Ana, Calif.

Application November 9, 1945, Serial No. 627,606

6 Claims. (Cl. 56—202)

My invention relates to new and useful improvements in grass catchers for lawn mowers.

An important object of my invention is the provision of a receptacle for catching grass that may be easily mounted on the conventional lawn mower and that includes means for throwing the severed particles of grass impinged therein by the rotary cutter of the lawn mower into the back portion of the receptacle.

Another object of my invention is the provision of a device of the above-mentioned character that is rendered automatically operative by the motion of the lawn mower to obviate the necessity of the operator manually pushing the severed grass particles into the back portion of the receptacle.

Still another object of my invention is the provision of a device of the above-mentioned character that is effective to prevent the grass particles in the receptacle from sliding forwardly therein and through the open front thereof.

Yet another object of my invention is the provision of a device of the above-mentioned character that is novel in its construction, inexpensive to manufacture and efficient and efficacious in the performance of its duties.

Other objects and advantages of my invention will be apparent during the course of the following description.

In the drawing, forming a part of this specification, and wherein like numerals are employed to designate like parts throughout the same, Figure 1 is a side elevation of a device embodying my invention and showing the same attached to a lawn mower of conventional design and construction, the movable panel embodying a part of the invention being shown in the normal horizontal position, Figure 2 is a fragmentary view similar to Figure 1, but showing the movable panel in the raised position, Figure 3 is a top plan view of my device, Figure 4 is a fragmentary vertical sectional view taken on the line 4—4 of Figure 3, and Figure 5 is a fragmentary perspective view of the device.

In the accompanying drawing, wherein for the purpose of illustration, is shown a preferred embodiment of my invention, the numeral 10 designates a lawn mower of conventional design having a wheeled frame 11 for supporting the stationary and rotary cutters (not shown), rearwardly extending brackets 12 supporting a roller 13 which operatively positions the cutters and a handle 14 having a transverse hand gripping portion 15 for facilitating manual operation of the mower. The above-described parts are conventional in the art and are recited merely for the purpose of facilitating the description of the application of my invention therewith.

My invention is directed to a grass catcher designated generally by the numeral 16, which catcher comprises a box-like receptacle 17 having a bottom 18 formed with upstanding rear and side walls 19, 20 and 21, respectively. The bottom, rear and side walls may be formed of sheet metal, or any other suitable material; however, the same are here illustrated as being formed of canvas, or the like, suitably secured to a frame of angle iron construction. As best illustrated in Figures 1, 2 and 5, the sides 20 and 21 extend substantially beyond the forward edge 22 of the bottom and a bar 23 extends between the forward ends of the side walls adjacent the bottom edges thereof. The bar is here illustrated as being supported at its opposite ends by the horizontal flanges of the angle irons 24 and 25 of the frame which ends may be welded or otherwise fixedly secured thereto.

It will be noted that the receptacle thus formed is closed on three sides and that the front and top thereof is open. The receptacle is arranged rearwardly of the lawn mower cutters with the open front thereof facing in the direction of the cutters, the relation being unique to permit the particles of grass severed by the cutters to be impinged or thrown therein through the open front and top thereof. This association of the receptacle with the lawn mower is clearly illustrated in Figures 1 and 2 and I provide a suitable fastening means 26 of wire or the like, the lower end of which is attached to the upper edge of the rear wall 19 and the upper end of which is fashioned with a hook 27 adapted to snap over the hand gripping portion 15 of the lawn mower handle. The wire 26 is of a length to normally hold the bottom of the receptacle spaced slightly above the surface of the ground when the front of the receptacle is spaced slightly rearwardly of the supporting roller 13 of the lawn mower.

I have provided a false bottom or panel 28 which extends the full width of the receptacle and hingedly connects with the forward edge 22 of the bottom 18. I prefer that the hinge connecting the panel to the bottom be of the piano or continuous hinge type and the portion 29 of the panel immediately forwardly of the hinge is inclined angularly upwardly and forwardly with relation to the normally horizontally disposed bottom of the receptacle. The portion 30 of the panel immediately forwardly of the inclined portion 29 is bent angularly to normally lie in an essentially horizontal plane and this portion of the panel seats upon and is supported by the upper edge of the bar 23. If necessary, the forward marginal edge 31 of the portion 30 may be bent angularly upwardly to rest upon or extend slightly above the peripheral surface of the lawn mower roller 13. It may thus be seen that the opening in the bottom of the receptacle defined by the forward edge of the bottom 18, the bar 23 and by the portions of the side walls 20 and 21 extending between the forward edge of the bottom and the bar is closed by the panel and that the panel normally extends a sufficient distance forwardly of the bar to position the forward edge thereof directly above the roller of the lawn mower.

In order that the receptacle and panel may be normally held in the above-described association with the lawn mower, I have provided a link member 32 of wire or the like that is attached to the panel of the grass catcher and rear brackets 12 of the lawn mower. As best illustrated in Figure 5, the link means is in the nature of a U-shaped wire bracket, the middle portion 33 of which is attached to the underside of the panel at the juncture of the portions 29 and 30 by means of the bearings 34. The arm portions 35 and 36 of the link means extend in the direction of the lawn mower and pass through elongated horizontal slots 36 in the bar 23 to arrange the inturned distal ends 37 and 38 thereof in position for pivotal connection with the rear brackets 12 of the lawn mower. By attaching the link means to both the panel and the lawn mower and by causing the arm portions 35 and 36 thereof to pass through the slots in the bar 23, the forward end of the receptacle will be maintained in slight spaced relation with the surface of the ground and normally positioned a selected distance rearwardly of the lawn mower. The elongated nature of the slots 36 will permit the arms to be adjusted to properly accommodate varying sizes of mowers.

It will be readily apparent that the grass particles thrown rearwardly by the rotary cutter of the mower will fall upon the panel 28 and bottom 18 of the receptacle. As is well known to those skilled in the art, however, the greatest portion of the grass particles will fall upon the panel. Heretofore it has been necessary for the operator to stop at frequent intervals and manually push the grass that falls into the front portion of the receptacle into the rear portion thereof. The conventional lawn mower will not throw the grass particles a sufficient distance to fill the rear portion of the receptacle and, therefore, as the grass accumulates in the front portion of the receptacle bottom, it begins to spill forwardly through the open front thereof. Attention is directed to the fact that the panel is hingedly mounted to the front edge of the bottom 18 whereby the panel may be rocked in a vertical plane about the hinge rod. In order to effect automatic rocking of the panel in this manner, I have provided the same with a plurality of lugs 39 extending downwardly and rearwardly from the hinge. During forward movement of the lawn mower, the lugs will be normally spaced slightly above the surface of the grass; however, it is obvious that even though the same are permitted to drag along the ground surface, the only effect will be to urge the panel downwardly against the upper edge of the bar 23. If, however, the lawn mower is reversely actuated, the lugs will project themselves into the grass and rock the panel to the vertical position illustrated in Figure 2. Upon the occurrence of this event all of the grass particles that have fallen onto the panel will be thrown into the rear portion of the receptacle.

It will be readily apparent that the operator by properly manipulating the mower may effect intermittent rocking of the panel about the hinge rod whereby to throw the particles of grass into the receptacle. It will not be necessary that the operator manually assist in any way in maintaining the rear portion of the receptacle filled with the grass particles. The forwardly and upwardly inclined section 29 of the panel will prevent the particles from pushing forwardly and spilling through the open front of the receptacle and periodic upward movement of the panel will prevent the front portion of the receptacle from being filled before the rear portion thereof. The actuation of the panel is automatically effected when the handle 14 of the mower is lowered slightly and reverse motion is imparted thereto. This is a maneuver frequently made when cutting grass and therefore requires no additional labor or skill on the part of the operator.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. A grass catcher for lawn mowers comprising a receptacle having a bottom arranged rearwardly of the rotary cutter of the mower; a panel hingedly mounted at the forward edge of the receptacle bottom, parts of said panel extending forwardly of the hinge and parts thereof extending rearwardly of the hinge and below the bottom for engaging the ground when the mower is reversely actuated to rock the panel about its hinge whereby to throw particles supported by the first-mentioned part of the panel into the said receptacle, and link means having parts pivoted to the panel at one side of its hinge and parts pivoted to the said lawn mower for controlling the movement of the receptacle relative to the lawn mower upon actuation of the said panel.

2. A grass catcher for lawn mowers comprising a receptacle having a bottom arranged rearwardly of the rotary cutter of the mower; a panel hingedly mounted at the forward edge of the receptacle bottom, said panel extending forwardly of the bottom and in the direction of the lawn mower, ground engaging means mounted in connection with and acting on the hinged end of the panel to rock the same upwardly when the said lawn mower is reversely actuated, and link means having parts pivoted to the panel at one side of its hinge and parts pivoted to the said lawn mower for controlling the movement of the receptacle relative to the lawn mower upon actuation of the said panel.

3. A grass catcher for lawn mowers comprising a receptacle having a bottom arranged rearwardly of the rotary cutter of the mower; a panel hingedly mounted at the forward edge of the receptacle bottom, parts of said panel extending forwardly of the hinge and parts thereof extending rearwardly of the hinge and below the bottom for engaging the ground when the mower is reversely actuated to rock the panel about its hinge whereby to throw particles supported by the first-mentioned part of the panel into the said receptacle, and a U-shaped link member having the middle portion thereof pivoted to the panel forwardly of the hinge and the terminal ends of the arm portions pivoted to the lawn mower whereby to normally maintain the forward edge of the panel in fixed relative association with the lawn mower.

4. A grass catcher for lawn mowers comprising a receptacle having a bottom arranged rearwardly of the rotary cutter of the mower; a panel hingedly mounted at the forward edge of the receptacle bottom, said panel extending forwardly of the bottom and in the direction of the lawn mower, ground engaging means mounted in connection with and acting on the hinged end of the panel to rock the same upwardly when the said lawn mower is reversely actuated, and a U-shaped link member having the middle portion thereof pivoted to the panel forwardly of the hinge and the terminal ends of the arm portions pivoted to the lawn mower whereby to normally maintain the forward edge of the panel in fixed relative association with the lawn mower.

5. A grass catcher for lawn mowers comprising a receptacle having a bottom arranged rearwardly of the rotary cutter of the mower; a panel hingedly mounted at the forward edge of the receptacle bottom, parts of said panel extending forwardly of the hinge and parts thereof extending rearwardly of the hinge and below the bottom for engaging the ground when the mower is reversely actuated to rock the panel about its hinge whereby to throw particles supported by the first-mentioned part of the panel into the said receptacle, a U-shaped link member having the middle portion thereof pivoted to the panel forwardly of the hinge and the terminal ends of the arm portions pivoted to the lawn mower whereby to normally maintain the forward edge of the panel in fixed relative association with the lawn mower, and bearings mounted on the forward end of the receptacle and slidably receiving the arm portions of the said link members.

6. A grass catcher for lawn mowers comprising a receptacle having a bottom arranged rearwardly of the rotary cutter of the mower; a panel hingedly mounted at the forward edge of the receptacle bottom, said panel extending forwardly of the bottom and in the direction of the lawn mower, ground engaging means mounted in connection with and acting on the hinged end of the panel to rock the same upwardly when the said lawn mower is reversely actuated, a U-shaped link member having the middle portion thereof pivoted to the panel forwardly of the hinge and the terminal ends of the arm portions pivoted to the lawn mower whereby to normally maintain the forward edge of the panel in fixed relative association with the lawn mower, and bearings mounted on the forward end of the receptacle and slidably receiving the arm portions of the said link members.

BART E. DE VOL.

REFERENCES CITED

The following references are of record in the file of this patent:

UNITED STATES PATENTS

| Number | Name | Date |
| --- | --- | --- |
| 1,684,744 | Reynolds | Sept. 18, 1928 |
| 2,148,825 | Lowther | Feb. 28, 1939 |